US010020701B2

(12) United States Patent
Kamiyoshihara et al.

(10) Patent No.: US 10,020,701 B2
(45) Date of Patent: Jul. 10, 2018

(54) BRUSHLESS MOTOR HAVING FIRST ADHESIVE PART BONDING MAGNET TO CORE AND SECOND ADHESIVE PART BONDING END SURFACE OF ROTOR CORE TO END SURFACE OF MAGNET

(71) Applicant: MABUCHI MOTOR CO., LTD., Matsudo, Chiba (JP)

(72) Inventors: Toshihiro Kamiyoshihara, Matsudo (JP); Shinya Ishihara, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 513 days.

(21) Appl. No.: 14/698,613

(22) Filed: Apr. 28, 2015

(65) Prior Publication Data

US 2015/0318747 A1 Nov. 5, 2015

(30) Foreign Application Priority Data

Apr. 30, 2014 (JP) ................. 2014-094087

(51) Int. Cl.
*H02K 1/28* (2006.01)
*H02K 1/27* (2006.01)
(Continued)

(52) U.S. Cl.
CPC ............. *H02K 1/2773* (2013.01); *H02K 1/28* (2013.01); *H02K 29/08* (2013.01); *H02K 1/27* (2013.01);
(Continued)

(58) Field of Classification Search
CPC .......... H02K 1/28; H02K 1/27; H02K 1/2773; H02K 1/278; H02K 1/2786; H02K 1/30;
(Continued)

(56) References Cited

U.S. PATENT DOCUMENTS 4,445,062 A * 4/1984 Glaser ................. H02K 1/2773
310/156.59
5,010,266 A * 4/1991 Uchida ................ H02K 1/2773
310/156.22
(Continued)

FOREIGN PATENT DOCUMENTS

CN 101667759 A 3/2010
CN 103117609 A 5/2013
(Continued)

OTHER PUBLICATIONS

The State Intellectual Property Office of People's Republic of China: First Office Action issued in Chinese Patent Application No. 201510213595.3 dated Aug. 25, 2017; 15 pages including English translation.
(Continued)

*Primary Examiner* — Bernard Rojas
*Assistant Examiner* — Maged Almawri
(74) *Attorney, Agent, or Firm* — Schwabe Williamson & Wyatt, PC

(57) ABSTRACT

A rotor includes: a rotor core; a plurality of magnets; and an adhesive that adhesively bonds the magnet to the rotor core. The magnets are housed in the magnet holders such that the same magnetic poles of adjacent magnets face each other in a circumferential direction of the rotor core. The adhesive includes: a first adhesive part that adhesively bonds two interior surfaces of the magnet holder facing the circumferential direction to the magnet and that reaches one of ends of the magnet in a direction of axis of the magnet; and a second adhesive part that adhesively bonds, on a side of one of end surfaces of the rotor core in a direction of axis of the rotor core, said end surface of the rotor core to an end surface of the magnet in an axial direction of the magnet and that is connected to the first adhesive part.

12 Claims, 8 Drawing Sheets

(51) Int. Cl.
*H02K 29/08* (2006.01)
*H02K 1/30* (2006.01)

(52) U.S. Cl.
CPC ............ *H02K 1/278* (2013.01); *H02K 1/2766* (2013.01); *H02K 1/2786* (2013.01); *H02K 1/30* (2013.01)

(58) Field of Classification Search
CPC .......... H02K 1/2706; H02K 1/02; H02K 1/16; H02K 1/24; H02K 1/2713; H02K 1/32; H02K 15/00; H02K 15/03; H02K 15/12; H02K 15/02; H02K 2213/03; H02K 9/06; H02K 11/215; H02K 11/0068; H02K 11/022; H02K 11/40; H02K 1/2766; H02K 29/08; H02K 29/00; H02K 29/14
USPC ........................... 310/156.01–156.58, 43, 45
See application file for complete search history.

(56) References Cited

U.S. PATENT DOCUMENTS

| | | | | |
|---|---|---|---|---|
| 6,353,275 | B1* | 3/2002 | Nishiyama | H02K 1/2706 310/156.21 |
| 6,984,908 | B2* | 1/2006 | Rinholm | H02K 1/278 29/598 |
| 9,246,364 | B2* | 1/2016 | Brahmavar | H02K 21/16 |
| 9,281,723 | B2* | 3/2016 | Watanabe | H02K 1/2766 |
| 9,343,934 | B2* | 5/2016 | Zhao | H02K 1/2773 |
| 2005/0099255 | A1* | 5/2005 | Zhang | H02K 33/18 335/251 |
| 2006/0255679 | A1* | 11/2006 | Dine | H02K 1/2773 310/156.55 |
| 2012/0181880 | A1* | 7/2012 | Zhao | H02K 1/2773 310/43 |
| 2013/0334907 | A1* | 12/2013 | Ikuta | H02K 1/2706 310/45 |
| 2014/0042857 | A1* | 2/2014 | Mader | H02K 1/2773 310/156.21 |
| 2015/0028710 | A1* | 1/2015 | Oka | H02K 1/2773 310/156.48 |

FOREIGN PATENT DOCUMENTS

| | | |
|---|---|---|
| CN | 103597714 A | 2/2014 |
| JP | 58-139665 | 8/1983 |
| JP | U11990037553 | 2/1990 |
| JP | 2005-269804 A | 9/2005 |
| JP | 2007-049834 | 2/2007 |
| JP | 2007-159361 A | 6/2007 |
| JP | 2007-166888 | 6/2007 |
| JP | 2010-063285 | 3/2010 |
| JP | 2013-106494 | 5/2013 |
| JP | 2013-172491 | 9/2013 |
| WO | 2013/121611 A1 | 8/2013 |

OTHER PUBLICATIONS

Notification of Reasons for Refusal issued in Japanese Patent Application No. 2014-094087 dated Aug. 8, 2017; 6 pages including English translation.
Notification of Reasons for Refusal for Japanese Application No. 2014-094087 dated Feb. 9, 2018; 6 pages including English translation.
Examination Opinion issued in Chinese Application No. 2015102135953, dated Mar. 28, 2018, 11 pages including English translation.

* cited by examiner

BRUSHLESS MOTOR HAVING FIRST ADHESIVE PART BONDING MAGNET TO CORE AND SECOND ADHESIVE PART BONDING END SURFACE OF ROTOR CORE TO END SURFACE OF MAGNET

CROSS-REFERENCE TO RELATED APPLICATIONS

This application is based upon and claims the benefit of priority from the prior Japanese Patent Application No. 2014-094087, filed on Apr. 30, 2014, the entire content of which is incorporated herein by reference.

BACKGROUND OF THE INVENTION

1. Field of the Invention

The present invention relates to a rotor and a brushless motor.

2. Description of the Related Art

In the conventional practice, motors are used as driving sources of various types of apparatuses and products. For example, the motors are used for business machines, such as printers and copying machines, various kinds of home electric appliances, and power assist sources of vehicles, such as automobiles and power-assisted bicycles. In particular, brushless motors are sometimes used as the driving sources of movable parts with high operation frequency in the light of increased durability and reduced noise.

Known as a type of such a brushless motor is an interior permanent magnet (IPM) motor where a permanent magnet is embedded in a rotor. Further, a motor is proposed in which an adhesive is used to fix a permanent magnet to a hole of the rotor core (see, for example, patent document 1).
[patent document 1] JP2005-269804

In the aforementioned motor, a plurality of plates are used in addition to the adhesive in order to fix the magnets in the core or to prevent dislocation thereof, resulting in a large number of components that should be assembled and a complex manufacturing process.

SUMMARY OF THE INVENTION

The present invention addresses the issue and a purpose thereof is to provide a simple and reliable technology for fixing magnets in a rotor.

The rotor according to one embodiment includes: a rotor core; a plurality of magnets; and an adhesive that adhesively bonds the magnet to the rotor core.

The rotor core includes: an annular part around a hole in which a rotating shaft is inserted; a plurality of magnetic pole pieces radially formed around the annular part; and a plurality of magnet holders radially formed between adjacent magnetic pole pieces. The magnets are housed in the magnet holders such that the same magnetic poles of adjacent magnets face each other in a circumferential direction of the rotor core. The adhesive includes: a first adhesive part that adhesively bonds two interior surfaces of the magnet holder facing the circumferential direction to the magnet and that reaches one of ends of the magnet in a direction of axis of the magnet; and a second adhesive part that adhesively bonds, on a side of one of end surfaces of the rotor core in a direction of axis of the rotor core, said end surface of the rotor core to an end surface of the magnet in an axial direction of the magnet and that is connected to the first adhesive part.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
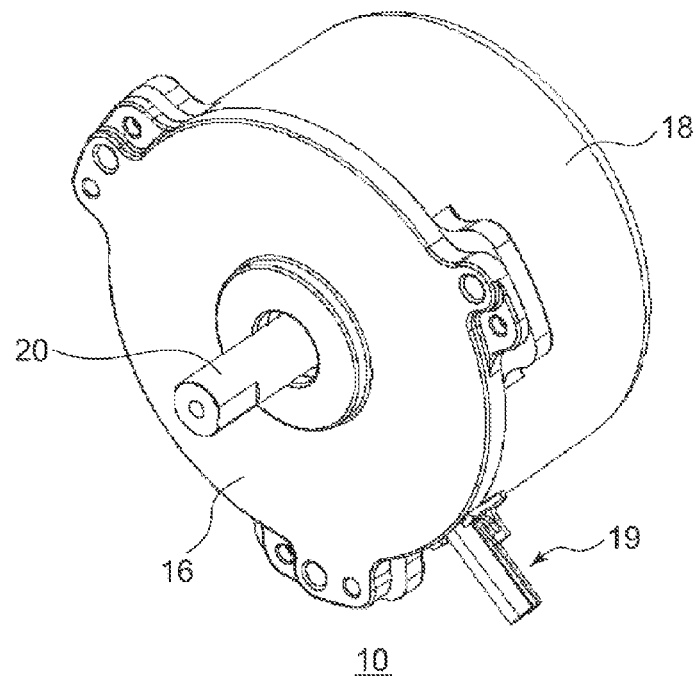
FIG. 1 is an overall perspective view of a brushless motor according to the embodiment.

The invention will now be described by reference to the preferred embodiments. This does not intend to limit the scope of the present invention, but to exemplify the invention.

A rotor according to an embodiment of the present invention includes: a rotor core; a plurality of magnets; and an adhesive that adhesively bonds the magnets to the rotor core. The rotor core includes: an annular part around a hole in which a rotating shaft is inserted; a plurality of magnetic pole pieces radially formed around the annular part; and a plurality of magnet holders radially formed between adjacent magnetic pole pieces. The magnets are housed in the magnet holders such that the same magnetic poles of adjacent magnets face each other in a circumferential direction of the rotor core. The adhesive includes: a first adhesive part that adhesively bonds two interior surfaces of the magnet holder facing the circumferential direction to the magnet and that reaches one of ends of the magnet in a direction of axis of the magnet; and a second adhesive part that adhesively bonds, on a side of one of end surfaces of the rotor core in a direction of axis of the rotor core, said end surface of the rotor core to an end surface of the magnet in an axial direction of the magnet and that is connected to the first adhesive part.

According to the embodiment, the two surfaces of the magnet facing the circumferential direction are adhesively fixed to the interior surfaces of the magnet holder, and the movement of the magnet in the axial direction is further restricted by the second adhesive part. For this reason, the magnet is firmly fixed at a predetermined position in the magnet holder without using a member other than the adhesive.

An outer circumference of the magnetic pole piece may be isolated from an adjacent magnetic pole piece. In this case, only the end of each magnetic pole piece toward the central axis is connected to the annular part so that the magnetic pole piece can easily be displaced from its position. According to the embodiment, however, a given magnetic pole piece is integrally fixed to an adjacent magnetic pole piece by the adhesive via the magnet so that the displacement of each magnetic pole piece is restrained and the rigidity of the rotor itself is improved.

The magnetic force of the magnet is 8 MGOe or higher. By housing the magnets in the magnet holders such that the same magnetic poles of adjacent magnets face each other in a circumferential direction of the rotor core, a large repulsive force drives the magnets to move in the direction of axis of the rotor. Since the second adhesive part restrains the movement, however, the magnets are more firmly fixed than in the case where only the first adhesive part is provided.

Another embodiment of the present invention relates to a brushless motor. The brushless motor includes a rotor, a stator including at its center a space for placing the rotor, a housing member that houses the rotor and the stator, and a detector that detects a signal dependent on the rotational position of the rotor based on variation in the magnetic field associated with the rotation of the rotor. The detector is provided at a position facing the end surface of the rotor core opposite to one of the end surfaces of the rotor core in which the second adhesive part is located.

According to the embodiment, the second adhesive part is not located between the axial end surface of the magnet and the detector so that it is possible to prevent the second adhesive part and the detector from interfering each other or prevent the second adhesive part from affecting the detection precision of the detector.

Given that the entire length of the magnet in the axial direction is L, the range of application of the first adhesive part may be 0.5-0.9 L. This restrains the adhesive from leaking from the other end surface of the magnet and prevents the adhesive from interfering with the detector or affecting the detection precision.

Still another embodiment of the present invention relates to a rotor. The rotor includes a rotor core, a plurality of magnets, an adhesive that adhesively bonds the magnet to the rotor core. The rotor core includes: an annular part around a hole in which a rotating shaft is inserted; a plurality of magnetic pole pieces radially formed around the annular part; and a plurality of magnet holders radially formed between adjacent magnetic pole pieces. An outer circumference of the magnetic pole piece is isolated from an adjacent magnetic pole piece. The magnets are housed in the magnet holders such that the same magnetic poles of adjacent magnets face each other in the circumferential direction of the rotor core. The adhesive is provided with an adhesive part that bonds the two interior surfaces of the magnet holder facing the circumferential direction to the magnet.

According to this embodiment, the magnets and the magnetic pole pieces alternately provided in the circumferential direction of the rotor are adhesively bonded to each other over the entire circumference. Therefore, the rigidity of the rotor as a whole is improved even if the rotor core has less than sufficient strength due to isolation between outer circumferences of the magnetic poles.

Optional combinations of the aforementioned constituting elements, and implementations of the invention in the form of methods, apparatuses, and systems may also be practiced as additional modes of the present invention. The embodiment described above realizes a rotor in which the magnets are fixed easily and reliably.

A description will be given of the embodiments of the present invention with reference to the drawings. Like numerals represent like elements so that the description will be omitted accordingly. The structures described hereinbelow are only exemplary and does not limit the scope of the present invention. A brushless motor of inner rotor type is described below by way of an example.

(Brushless Motor)

Figure 2:
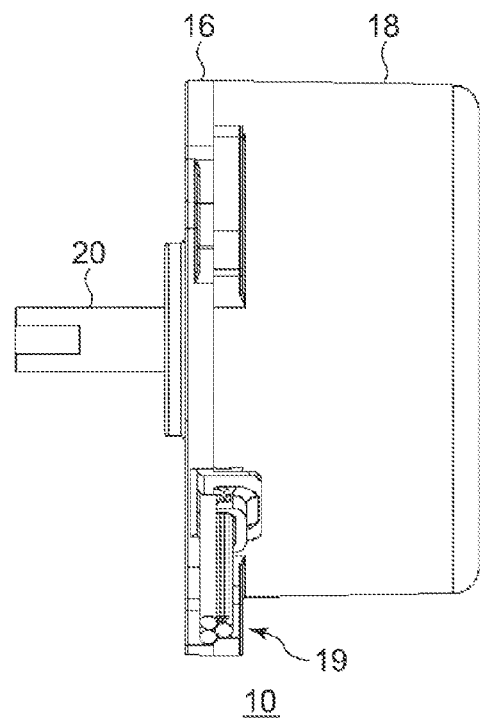
FIG. 2 is a lateral view of the brushless motor according to the embodiment.
Figure 3:
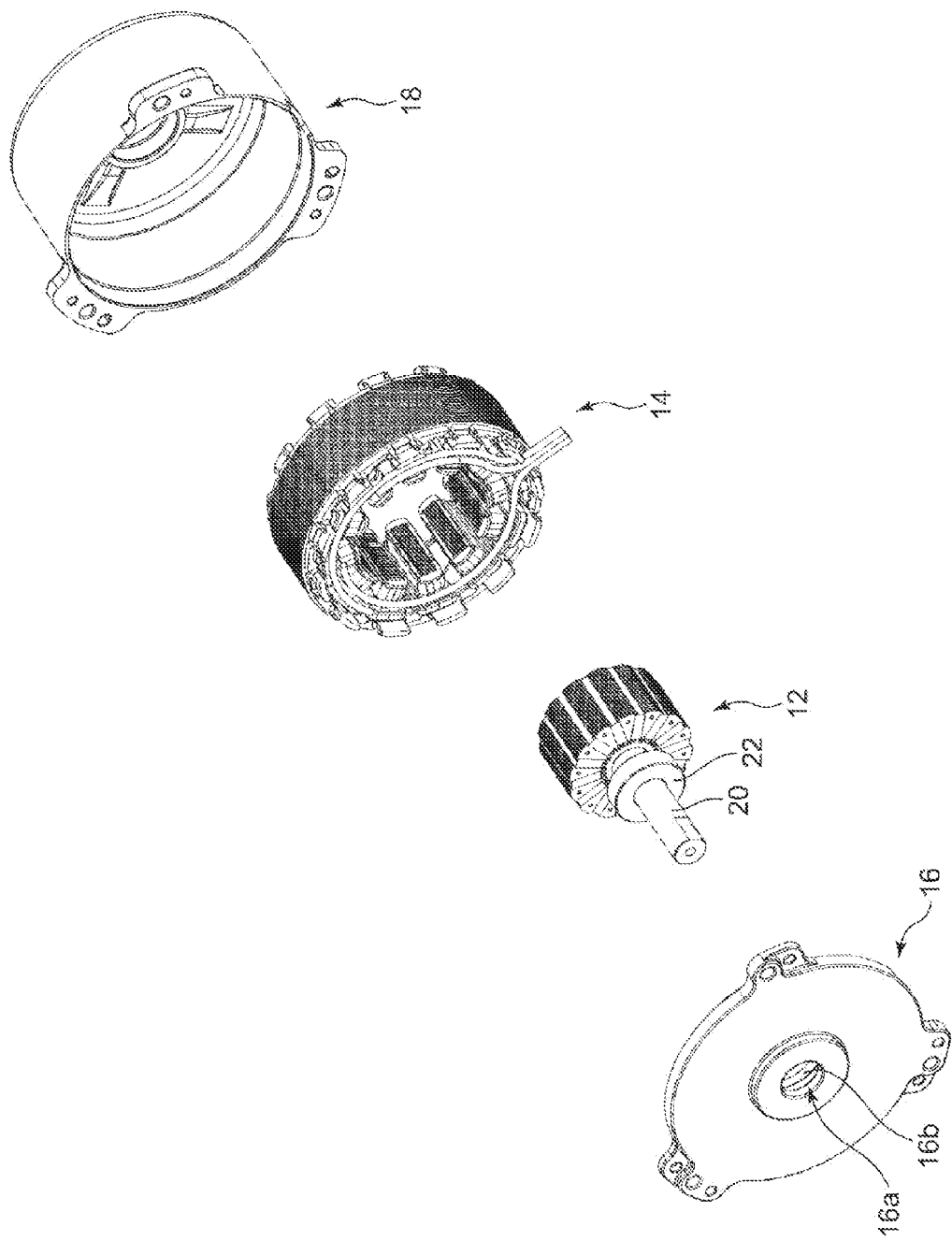
FIG. 3 is an exploded perspective view of the brushless motor according to the embodiment.
Figure 4:
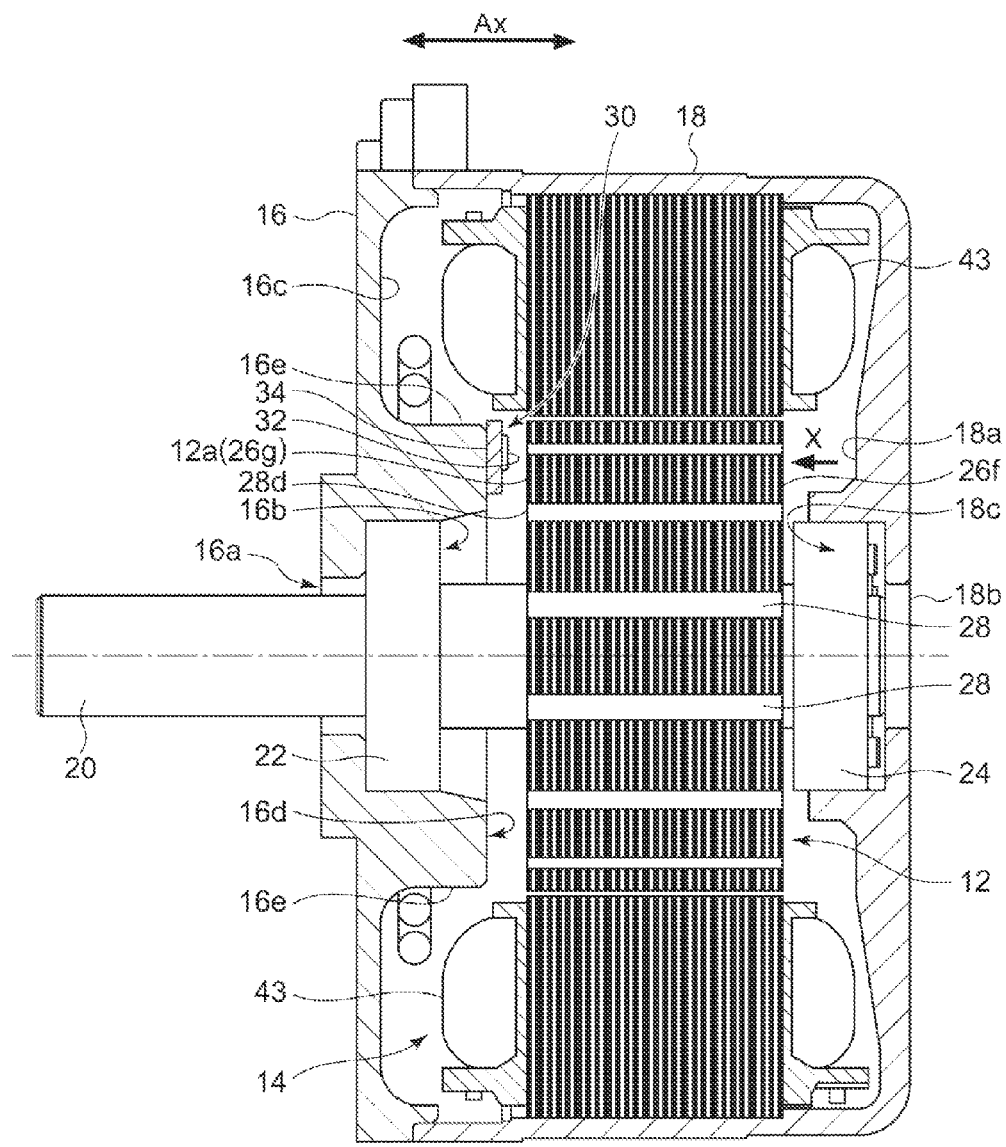
FIG. 4 is a lateral cross-sectional view of the brushless motor according to the embodiment.

FIG. 1 is an overall perspective view of a brushless motor according to the embodiment. FIG. 2 is a lateral view of the brushless motor according to the embodiment. FIG. 3 is an exploded perspective view of the brushless motor according to the embodiment. FIG. 4 is a lateral cross-sectional view of the brushless motor according to the embodiment.

The brushless motor (hereinafter, sometimes referred to as "motor") 10 according to the embodiment includes a columnar rotor 12 including a magnet, a stator 14 including at its center a space for placing the rotor 12, a front bell 16, a housing body 18, and a power feeder 19.

The front bell 16, which is a plate-shaped member, is formed with a hole 16a at the center so that a rotating shaft 20 can penetrate therethrough, and is formed with a recess 16b near the hole 16a to hold a bearing 22. The front bell 16 supports a portion of the rotating shaft 20 of the rotor 12 via the bearing 22. The housing body 18 is a cylindrical member. A hole 18b is formed at the center of a base 18a, and a recess 18c for supporting a bearing 24 is formed near the hole 18b. The housing body 18 supports another portion of the rotating shaft 20 of the rotor 12 via the bearing 24. In this embodiment, the front bell 16 and the housing body 18 constitute a housing member for housing the rotor 12 and the stator 14.

A detector 30 shown in FIG. 4 detects a signal dependent on the rotational position of the rotor 12 based on the variation in the magnetic field associated with the rotation of the rotor 12. More specifically, the detector 30 is implemented by mounting a detection element 32 such as a Hall element, a Hall IC, and a magnetic resistance (MR) element on a substrate 34. The detector 30 according to the embodiment is provided with three detection elements 32.

The front bell 16 includes a base 16c, a support 16d formed at the center of the base 16c and supporting the rotating shaft 20 via the bearing 22, and a mount 16e integrally formed around the support 16d and fitted with the detector 30. As shown in FIG. 4, the mount 16e projects from the base 16c toward an end face 12a of the rotor 12 as far as a position that does not interfere with the stator winding 43.

(Rotor)

Figure 5A:
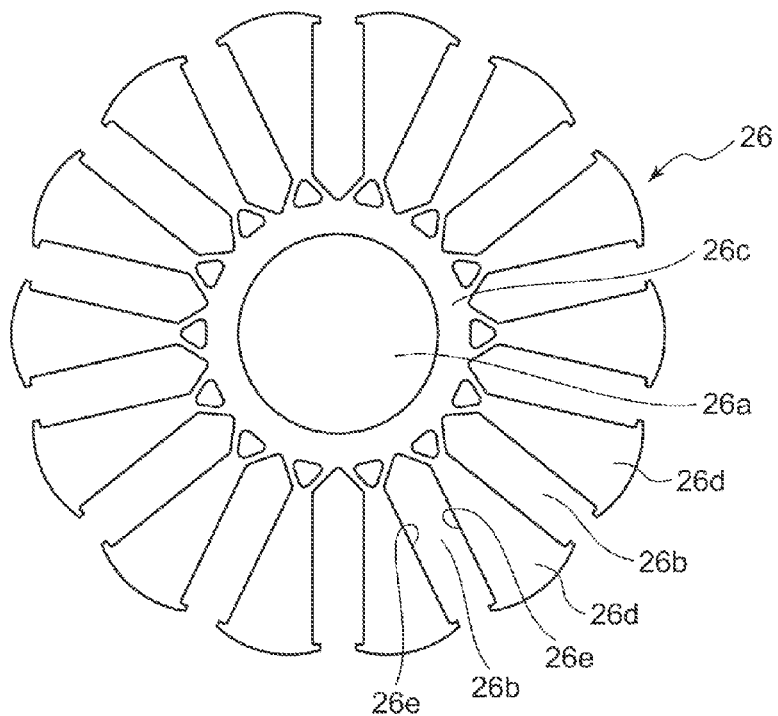
FIG. 5A is a top view of the rotor core according to the embodiment.
Figure 5B:
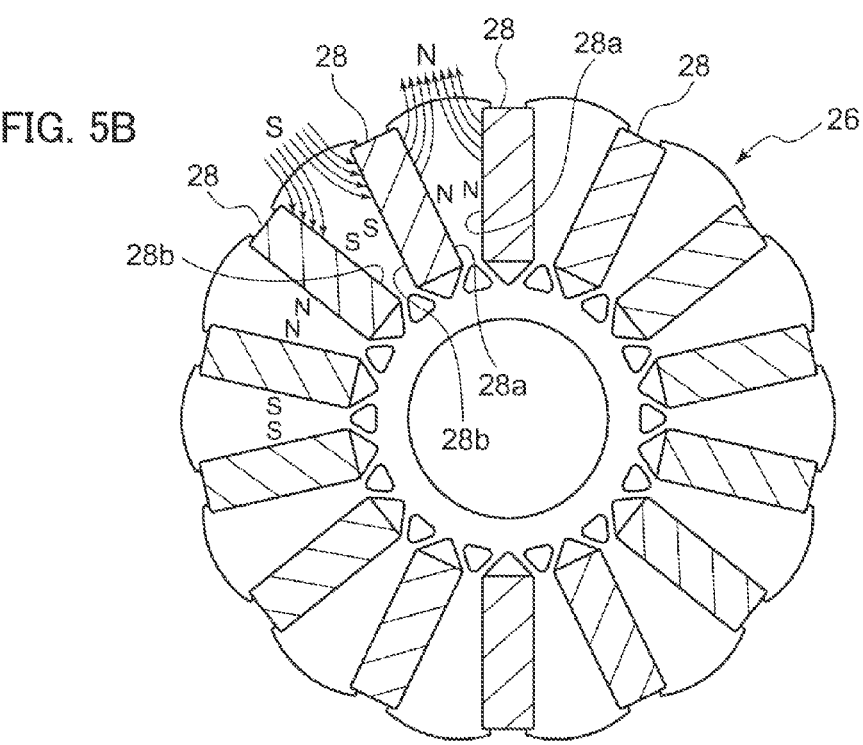
FIG. 5B is a top view showing how the magnet is fitted into the rotor core shown in FIG. 5A.

FIG. 5A is a top view of the rotor core according to the embodiment, and FIG. 5B is a top view showing how the magnet is fitted into the rotor core shown in FIG. 5A.

The rotor 12 includes a circular rotor core 26 and a plurality of magnets 28. A through hole 26a, in which the rotating shaft 20 is inserted and fixed, is formed in the center of the rotor core 26. The rotor core 26 further includes an annular part 26c around the through hole 26a in which the rotating shaft 20 is inserted, a plurality of fan-shaped magnetic pole pieces 26d radially formed around the annular part 26c, and a plurality of magnet holders 26b in which the magnets 28 are inserted and fixed. The magnet 28 is a members of a plate shape conforming to the shape of the magnet holder 26b. The magnet holders 26b are radially formed between two adjacent magnetic pole pieces 26d.

The members described above are assembled in sequence. More specifically, a plurality (i.e., fourteen) of magnets 28 are fitted into the corresponding magnet holders 26b using the adhesive described later, and the rotating shaft 20 is inserted into the through hole 26a of the rotor core 26. The bearings 22 and 24 are then mounted to the rotating shaft 20.

(Rotor Core)

The rotor core 26 shown in FIG. 5A is built by laminating a plurality of plate-shaped members. Each of the plurality of plate-shaped members is manufactured such that a non-oriented electromagnetic steel sheet (e.g., silicon steel sheet) is stamped out into a predetermined shape, as shown in FIG. 5A, by press-forming. The magnet holders 26*b* are radially formed around the rotating shaft of the rotor core 26. The rotor core 26 may alternatively be configured to have an arbitrary shape by powder compacting.

As shown in FIG. 5B, the magnets 28 are housed in the magnet holders 26*b* such that the same magnetic poles of adjacent magnets face each other in the circumferential direction of the rotor core 26. In other words, the magnets 28 are configured such that principal surfaces 28*a* and 28*b*, whose surface areas are largest among the six surfaces of each of the adjacent magnets 28 that are approximately rectangular parallelepipeds, are an N-pole and an S-pole, respectively. Thus, the lines of magnetic force emanating from the principal surface 28*a* of the magnet 28 are directed outward of the rotor core 26 from an area between the two adjacent magnets 28. As a result, the rotor 12 according to the embodiment functions as fourteen magnets such that seven N-poles and seven S-poles are alternately formed on the outer circumferential of the rotor 12.

The magnet 28 is a bonded magnet, a sintered magnet or the like, for instance. The bonded magnet is a magnet formed such that a magnetic material is kneaded with a rubber or resin material and then the resulting material undergoes injection molding or compression molding. On the other hand, the sintered magnet is a magnet formed such that powered magnetic materials are sintered at high temperature. The sintered magnet is more likely to improve the residual magnetic flux density than the bonded magnet is.

(Structure of Fixing the Magnet)

By housing the magnets 28 in the magnet holders 26*b* such that the same magnetic poles of adjacent magnets 28 face each other in a circumferential direction of the rotor core 26, as in the rotor 12 according to the embodiment, a large repulsive force is generated that drives the magnets to move away from each other in the direction of rotational axis of the rotor 12. In particular, if the magnetic force of the magnets 28 is large, the repulsive force is large accordingly so that additional measures are necessary to fix the magnets 28 properly.

Figure 6:
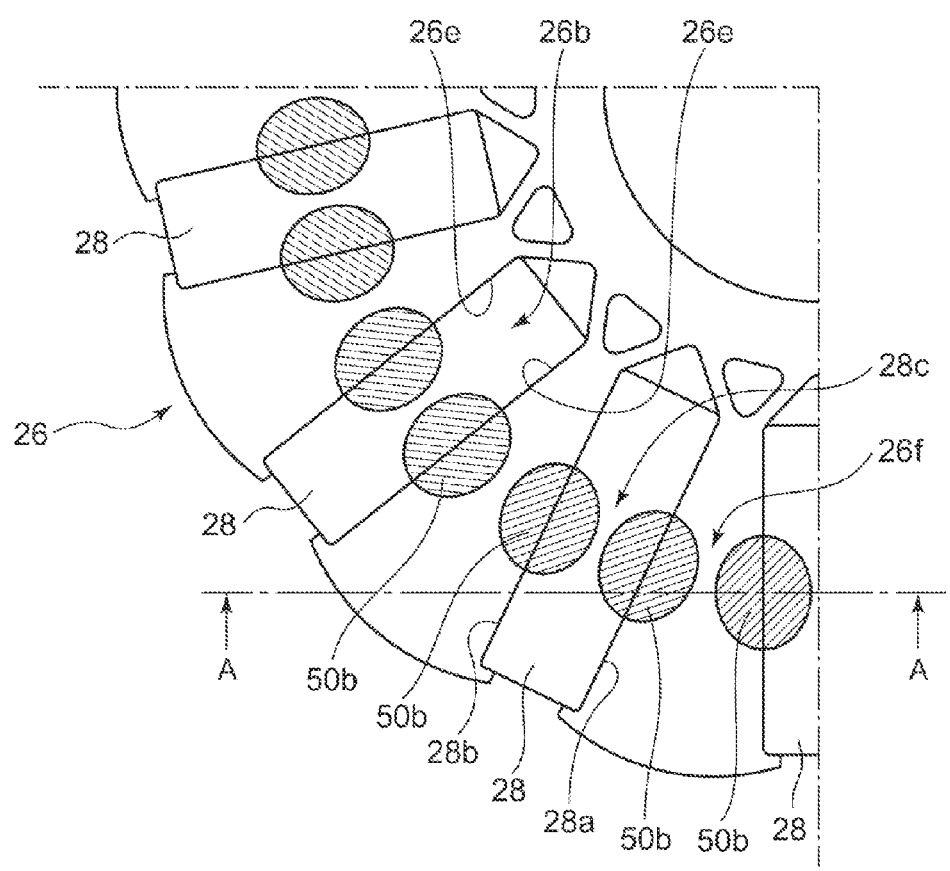
FIG. 6 is a top view of a part of the rotor as viewed in the direction X shown in FIG. 4.
Figure 7:
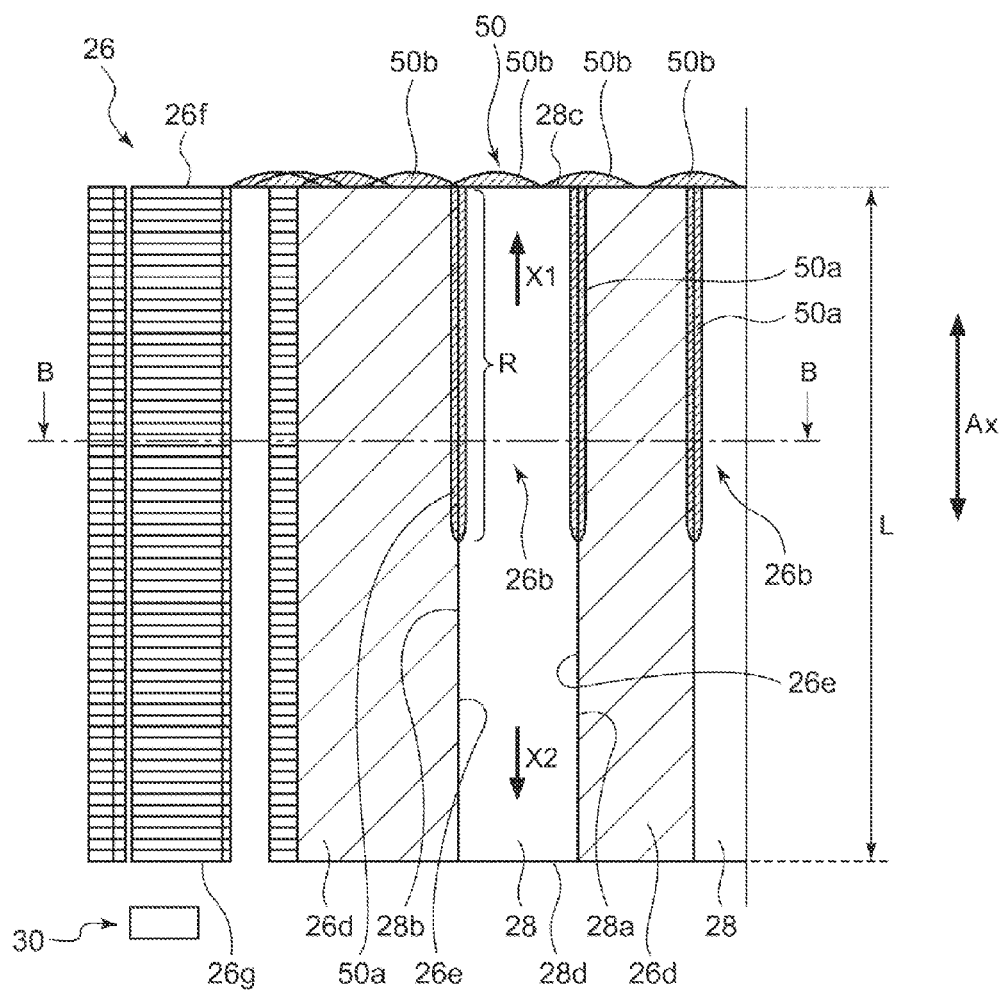
FIG. 7 shows a section A-A of the rotor shown in FIG. 6.
Figure 8:
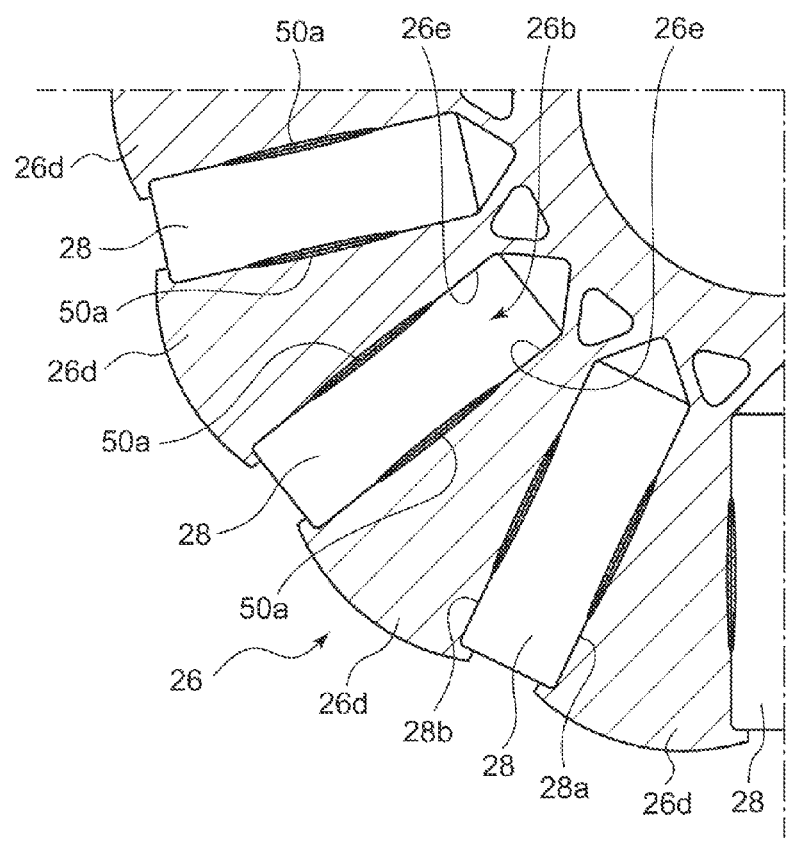
FIG. 8 shows a section B-B of the rotor shown in FIG. 7.

The rotor 12 according to the embodiment is provided with an adhesive-based fixing structure that addresses the above consideration. FIG. 6 is a top view of a part of the rotor 12 as viewed in the direction X shown in FIG. 4. FIG. 7 shows a section A-A of the rotor 12 shown in FIG. 6. FIG. 8 shows a section B-B of the rotor 12 shown in FIG. 7.

As shown in FIGS. 6 through 8, the rotor 12 is provided with an adhesive 50 for bonding the plurality of magnets 28 to the rotor core 26. The adhesive 50 includes a first adhesive part 50*a* that bonds two interior surfaces 26*e* of the magnet holder 26*b* facing the circumferential direction to the magnet 28 and that reaches one of end surfaces 28*c* (see FIG. 7) of the magnet 28 in a direction Ax of axis of the magnet 28. Further, the adhesive 50 includes a second adhesive part 50*b* that bonds, on one of end surfaces 26*f* of the rotor core 26 in the direction Ax of axis of the rotor core 26, the end surface 26*f* of the rotor core 26 to one of the end surfaces 28*c* of the magnet 28 in the direction of axis of the magnet 28. Further, the first adhesive part 50*a* is connected to the second adhesive part 50*b*.

In the rotor 12 configured as described above, the magnets 28 are configured such that principal surfaces 28*a* and 28*b* of the magnet 28 facing the circumferential direction are adhesively bonded to the magnet holder 26*b* by the first adhesive part 50*a*. The movement of the magnet 28 in the axial direction is further restrained by the second adhesive part 50*b*. Therefore, the magnet 28 is firmly fixed at a predetermined position of the magnet holder 26*b* without using any member other than the adhesive.

The adhesive 50 may be any of various adhesives including an acrylic adhesive and an epoxy adhesive. An acrylic adhesive may be preferably be used. This ensures that bonding occurs at a relatively low temperature and reduces, for example, the impact from demagnetization of the magnet due to the process of heating the adhesive.

An outer circumference of the magnetic pole piece 26*d* according to the embodiment is isolated from an adjacent magnetic pole piece 26*d* (see FIG. 5A). In this case, only the end of each magnetic pole 26*d* piece toward the central axis is connected to the annular part 26*c* to form the rotor core so that the magnetic pole piece 26*d* can easily be displaced from its position. According to the rotor core of the embodiment, however, a given magnetic pole piece 26*d* is integrally fixed to an adjacent magnetic pole piece 26*d* by the adhesive 50 via the magnet 28 so that the displacement of each magnetic pole piece 26*d* is restrained.

By adhesively bonding the magnets 28 and the magnetic pole pieces 26*d* alternately provided in the circumferential direction of the rotor to each other over the entire circumference, the rigidity of the rotor 12 as a whole is improved, vibration and noise of the motor are reduced, the quality of the motor is improved, and the performance of the motor is stabilized.

The method of fixing the magnet in the rotor according to the embodiment is applicable regardless of the magnetic force of the magnet 28, but the benefit is notable when, for example, the principal surfaces of the magnet used have a magnetic force of 8 MGOe or higher. As mentioned above, the magnets 28 with a high magnetic force housed in the magnet holder 26*b* are driven to move away from each other due to a large repulsive force. Due to the shape of the rotor core 26, the magnet 28 is mechanically fixed in the radial direction and the circumferential direction so that the magnet 28 is consequently driven to move in the direction of axis of the rotor. However, the movement is restrained by the second adhesive part 50*b* according to the embodiment so that the magnet 28 is more firmly fixed as compared with a case where only the first adhesive part 50*a* is provided.

More specifically, if a force is exerted on the magnet 28 in the direction X1 shown in FIG. 7, the magnet 28 is restrained from moving relative to the rotor core 26 since one of the end surfaces 26*f* of the rotor core 26 is connected to one of the end surfaces 28*c* of the magnet 28 via the second adhesive part 50*b*. Meanwhile, if a force is exerted on the magnet 28 in the direction X2 shown in FIG. 7, the second adhesive part 50*b* functions as a locking part, restraining the magnet 28 from moving relative to the rotor core 26. Thus, the second adhesive part 50*b* as well as the first adhesive part 50*a* of the adhesive 50 prevent the magnet 28 from moving in the direction of axis Ax.

In particular, since the second adhesive part 50*b* is configured to be integrated with the first adhesive part 50*a*, movement of the magnet 28 in the direction of axis Ax is more properly restrained when the adhesive is dried.

In the motor 10 according to the embodiment, the detector 30 is provided at a position facing an end surface 26*g* opposite to the end surface 26*f* of the rotor core 26 in which the second adhesive part 50*b* is located. Since the second adhesive part 50*b* is not located between the end surface 28*d* of the magnet 28 in the direction of axis Ax and the detector 30 in this arrangement of the detector 30, the second adhesive part 50b is prevented from interfering with the detector 30 and from affecting the detection precision of the detector 30.

Given that the entire length of the magnet in the axial direction is L, the range R of application of the first adhesive part 50a in the axial direction may be 0.5 L or more. This ensures that the adhesive force of the first adhesive part 50a provides a desired fixing force. If the range R of application is 0.9 L or less, the adhesive 50 of the first adhesive part 50a is restrained from being extruded from the end surface 28d of the magnet 28 toward the detector 30 due to variation occurring in the manufacturing steps or steeping of the adhesive, preventing the adhesive 50 from interfering with the detector 30 or affecting the detection precision of the detector 30.

Since the first adhesive part 50a is provided on both the principal surfaces 28a and 28b of the magnet 28, the magnet 28 is prevented from displacing inside the magnet holder 26b in the circumferential direction of the rotor. As a result, vibration or noise of the motor are reduced.

The description assumes that the plurality of radially arranged magnets 28 are I-shaped, but the same description applies to a configuration in which the magnets 28 are in a V-shape.

(Method of Adhesively Bonding Magnets)

Figure 9:
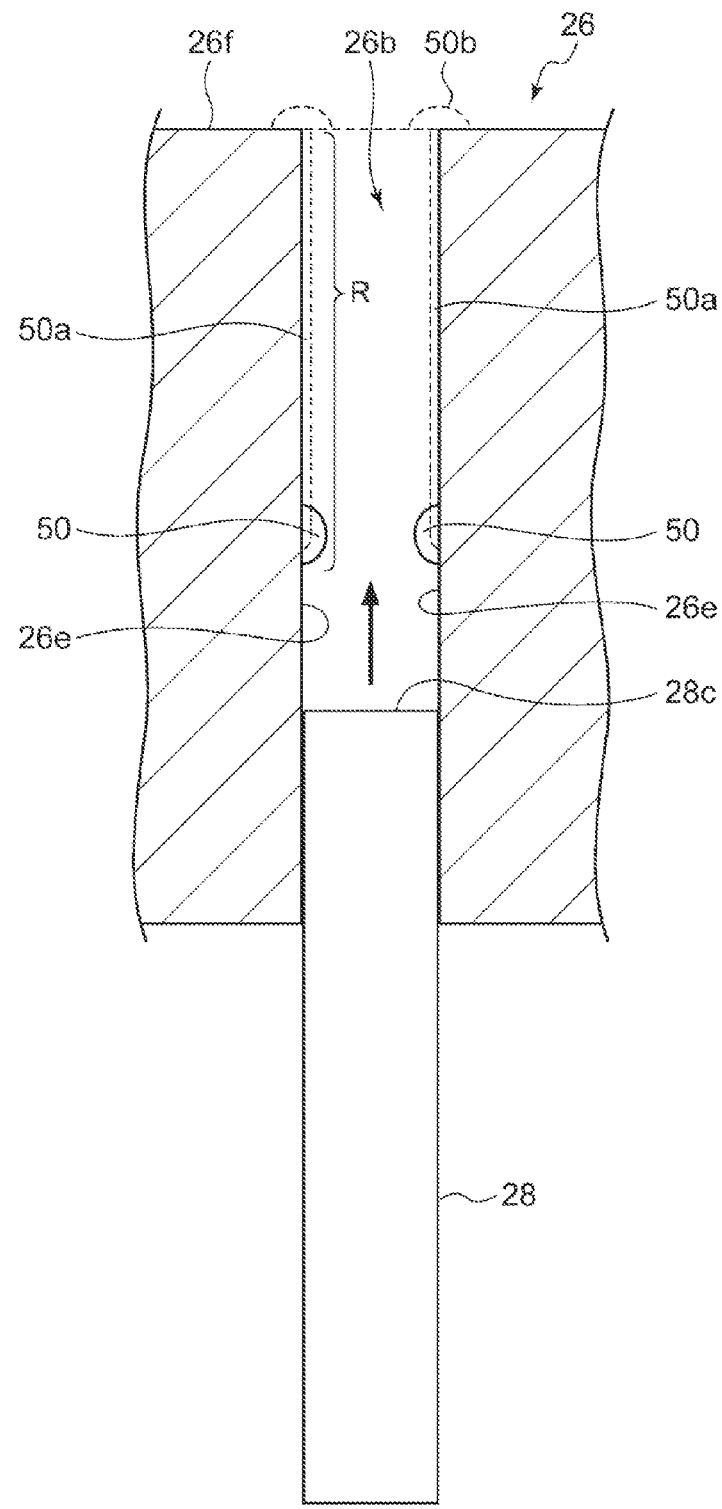
FIG. 9 schematically shows a step performed in the method of manufacturing the rotor according to the embodiment.

FIG. 9 schematically shows a step performed in the method of manufacturing the rotor according to the embodiment. According to the step shown in FIG. 9, the magnet 28 is fixed in the magnet holder 26b of the rotor core 26 by using the adhesive 50. First, the adhesive 50 is applied by potting to a predetermined position on the two interior surfaces 26e of the magnet holder 26b by a predetermined amount. The predetermined position is located at an end of the desired range R of application. Subsequently, the magnet 28 is inserted from the side opposite to the range R of application and is slid down until the end surface 28c is substantially flush with the end surface 26f of the rotor core 26, using the end surface 28c of the magnet 28 to apply the adhesive 50. This forms the first adhesive part 50a and the second adhesive part 50b described above.

A description will now be given of the specification of the brushless motor in which the embodiments can be suitably used. The outer diameter of the brushless motor according to the embodiments is about 30-140 mm and, preferably, about 35-85 mm. The number of grooves (teeth) of the stator is, for example, 12. It is preferable that the number of magnets be 10 or 14. The magnetic force (energy product) of the magnet is 8 MGOe or higher, and, preferably, 10 MGOe or higher, and, more preferably, 30 MGOe or higher. Further, the diameter of the rotor is preferably 20-70 mm.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

What is claimed is:

1. A rotor comprising:
a rotor core;
a plurality of magnets; and
an adhesive that adhesively bonds the magnet to the rotor core, wherein
the rotor core includes:
an annular part around a hole in which a rotating shaft is inserted;
a plurality of magnetic pole pieces radially formed around the annular part; and
a plurality of magnet holders radially formed between adjacent magnetic pole pieces, wherein
the magnets are housed in the magnet holders such that the same magnetic poles of adjacent magnets face each other in a circumferential direction of the rotor core, wherein
the adhesive includes:
a first adhesive part that adhesively bonds two interior surfaces of the magnet holder facing the circumferential direction to the magnet and that reaches one end of the magnet in a direction of axis of the magnet; and
a second adhesive part that adhesively bonds on a side of one end of the rotor core in a direction of axis of the rotor core, said end surface of the rotor core to an end surface of the magnet in an axial direction of the magnet and that is connected to the first adhesive part.

2. The rotor according to claim 1, wherein
a magnetic force (energy product) of the magnet is 8 MGOe or higher.

3. A brushless motor comprising:
the rotor according to claim 2;
a stator including at its center a space for placing the rotor;
a housing member that houses the rotor and the stator; and
a detector that detects a signal dependent on a rotational position of the rotor based on variation in a magnetic field associated with a rotation of the rotor, wherein
the detector is provided at a position facing an end surface opposite to the end surface of the rotor core in which the second adhesive part is located.

4. A brushless motor comprising:
the rotor according to claim 1;
a stator including at its center a space for placing the rotor;
a housing member that houses the rotor and the stator; and
a detector that detects a signal dependent on a rotational position of the rotor based on variation in a magnetic field associated with a rotation of the rotor, wherein
the detector is provided at a position facing an end surface opposite to the end surface of the rotor core in which the second adhesive part is located.

5. The brushless motor according to claim 4, wherein given that an entire length of the magnet in an axial direction is L, a range of application of the first adhesive part in the axial direction is 0.5-0.9 L.

6. The rotor according to claim 1, wherein
an outer circumference of the magnetic pole piece is isolated from an adjacent magnetic pole piece.

7. The rotor according to claim 6, wherein
a magnetic force (energy product) of the magnet is 8 MGOe or higher.

8. A brushless motor comprising:
the rotor according to claim 6;
a stator including at its center a space for placing the rotor;
a housing member that houses the rotor and the stator; and
a detector that detects a signal dependent on a rotational position of the rotor based on variation in a magnetic field associated with a rotation of the rotor, wherein
the detector is provided at a position facing an end surface opposite to the end surface of the rotor core in which the second adhesive part is located.

9. A rotor comprising:
a rotor core;
a plurality of magnets; and
an adhesive that adhesively bonds the magnet to the rotor core, wherein
the rotor core includes:
a plurality of magnet holders, wherein
the magnets are housed in the magnet holders, and
the adhesive includes:
a first adhesive part that adhesively bonds interior surfaces of the magnet holder to the magnet and that reaches one end of the magnet in a direction of axis of the magnet; and
a second adhesive part that adhesively bonds on a side of one end surface of the rotor core in a direction of axis of the rotor core, said end surface of the rotor core to an end surface of the magnet in an axial direction of the magnet and that is connected to the first adhesive part.

10. The rotor according to claim 9, wherein
the rotor core includes:
an annular part around a hole in which a rotating shaft is inserted; and
a plurality of magnetic pole pieces radially formed around the annular part.

11. The rotor according to claim 10, wherein
the plurality of magnet holders are radially formed between adjacent magnetic pole pieces.

12. The rotor according to claim 11, wherein
the magnets are housed in the magnet holders such that the same magnetic poles of adjacent magnets face each other in a circumferential direction of the rotor core.

* * * * *